(12) United States Patent
Lv et al.

(10) Patent No.: US 10,612,179 B2
(45) Date of Patent: Apr. 7, 2020

(54) AUTOMATIC WASHING MACHINE AND CONTROL METHOD

(71) Applicant: QINGDAO HAIER WASHING MACHINE CO., LTD., Qingdao, Shandong (CN)

(72) Inventors: Peishi Lv, Shandong (CN); Sheng Xu, Shandong (CN); Lin Yang, Shandong (CN)

(73) Assignee: QINGDAO HAIER WASHING MACHINE CO., LTD., Qingdao, Shandong (CN)

( * ) Notice: Subject to any disclaimer, the term of this patent is extended or adjusted under 35 U.S.C. 154(b) by 310 days.

(21) Appl. No.: 15/505,364

(22) PCT Filed: Nov. 18, 2014

(86) PCT No.: PCT/CN2014/091404
§ 371 (c)(1),
(2) Date: Feb. 21, 2017

(87) PCT Pub. No.: WO2016/029563
PCT Pub. Date: Mar. 3, 2016

(65) Prior Publication Data
US 2017/0268150 A1    Sep. 21, 2017

(30) Foreign Application Priority Data
Aug. 26, 2014    (CN) .......................... 2014 1 0425002

(51) Int. Cl.
*D06F 37/40* (2006.01)
*D06F 17/08* (2006.01)
(Continued)

(52) U.S. Cl.
CPC .............. *D06F 37/40* (2013.01); *D06F 17/08* (2013.01); *D06F 37/304* (2013.01); *H02K 7/116* (2013.01); *H02K 16/02* (2013.01)

(58) Field of Classification Search
CPC ........ D06F 37/40; D06F 37/304; D06F 17/08; H02K 16/02; H02K 7/116
See application file for complete search history.

(56) References Cited

U.S. PATENT DOCUMENTS

| 5,818,144 A * | 10/1998 | Kim ...................... D06F 37/304 310/266 |
| 2003/0213271 A1* | 11/2003 | Lim ........................ D06F 37/40 68/23.3 |

(Continued)

FOREIGN PATENT DOCUMENTS

| CN | 1282132 A | 1/2001 |
| CN | 1743535 A | 3/2006 |

(Continued)

OTHER PUBLICATIONS

Machine Translation of JP 59108596 to Koujirou et al., Jun. 1984. (Year: 1984).*

(Continued)

*Primary Examiner* — Benjamin L Osterhout
(74) *Attorney, Agent, or Firm* — Buchanan Ingersoll & Rooney PC (57) ABSTRACT

A washing machine comprises an outer tub, an inner tub, a pulsator and a driving means having two rotors, a stator and a deceleration mechanism. One rotor drives the pulsator, and the other rotor drives the inner tub. During washing, the two rotors drive the pulsator and the inner tub to rotate in the same or opposite directions, and during dehydration, the pulsator and the inner tub rotate in the same direction and at the same speed. The automatic washing machine saves on (Continued)

energy consumption, has stable output and has high transmission efficiency.

14 Claims, 4 Drawing Sheets

(51) Int. Cl.
    *D06F 37/30*     (2020.01)
    *H02K 16/02*     (2006.01)
    *H02K 7/116*     (2006.01)

(56) References Cited

U.S. PATENT DOCUMENTS

| | | | |
|---|---|---|---|
| 2004/0112096 A1* | 6/2004 | Stephens | D06F 37/304 68/12.02 |
| 2004/0139768 A1* | 7/2004 | Kim | D06F 37/304 68/12.24 |
| 2005/0166643 A1* | 8/2005 | Cho | D06F 37/304 68/12.02 |
| 2006/0042022 A1 | 3/2006 | Kim et al. | |
| 2014/0091662 A1* | 4/2014 | Kim | H02K 7/14 310/114 |
| 2014/0305172 A1* | 10/2014 | Kim | H02K 21/12 68/131 |
| 2015/0318805 A1 | 11/2015 | Kim et al. | |

FOREIGN PATENT DOCUMENTS

| | | |
|---|---|---|
| CN | 102877269 A | 1/2013 |
| CN | 203530710 U | 4/2014 |
| CN | 204138927 U | 2/2015 |
| JP | 59-108596 A | 6/1984 |
| JP | S59-108595 A | 6/1984 |
| KR | 20080064317 A | 7/2008 |
| WO | 2014/112839 A1 | 7/2014 |

OTHER PUBLICATIONS

International Search Report (PCT/ISA/210) dated May 15, 2015, by the Chinese Patent Office as the International Searching Authority for International Application No. PCT/CN2014/091404.

Written Opinion (PCT/ISA/237) dated May 15, 2015, by the Chinese Patent Office as the International Searching Authority for International Application No. PCT/CN2014/091404.

Extended European Search Report dated Jul. 17, 2017, issued by the European Patent Office in corresponding European Application No. 14900370.9. (5 pages).

* cited by examiner

AUTOMATIC WASHING MACHINE AND CONTROL METHOD

FIELD OF THE INVENTION

The present disclosure relates to a washing machine, more particularly to a fully automatic washing machine and a control method for driving a pulsator and an inner tub to rotate by using a double rotor direct drive motor.

BACKGROUND OF THE INVENTION

The rotation of pulsator and inner tub of a traditional pulsator washing machine is driven by a deceleration clutch to which a motor drives a belt through a pulley to transmit power. The deceleration clutch through its internal gear structure, transforms the motor's high speed rotation into a lower speed rotation which is required in different washing process of the washing machine. At the same time, according to different washing methods, the deceleration clutch uses different gear structure which transmits different rotation directions and rotation modes to the pulsator.

Because the deceleration clutch and the motor are laterally arranged at the bottom of the outer tub, the whole system structure is relatively large in the structure described above. On the other hand, the deceleration clutch is located at the center of the outer tub, and the motor is offset from the central portion. Therefore, the center of the entire structure of the outer tub is offset from the center hole of the outer tub. During the operation of the washing machine, the motor drives the deceleration clutch to work and produces a torque relative to the outer tub when they rotating. And that increases the instability of the entire system, the noise and vibration generated during the washing process are relatively large.

In order to reduce the noise and vibration generated during the working process of the washing machine, many of the existing washing machines are using direct drive motor without the belt pulley device and the deceleration clutch is vertically installed on the motor. Such that the center of gravity of the outer tub bottom structure is located substantially at the center of rotation of the outer tub. This structure improves the transmission efficiency and stability of the motor, while reducing the noise during operation.

However, in the existing improved direct drive motor structure, the speed of the direct drive motor is high, so normally an intermediate gear structure is provided in the deceleration clutch. As the structure is relatively large, the whole system in the vertical height is relatively large. Therefore, the whole effect of noise and vibration control is not too ideal.

The Chinese patent application No. 00120729.6 discloses a power direct drive device for a washing machine which comprises: a disc type speed regulating motor, a washing shaft and a motor output shaft, a dehydration shaft rotatably supported on the washing shaft. The motor built-in electromagnetic clutch is respectively fixed to the washing shaft and the dehydration shaft. A motor built-in loss of power brake, is fixed with the dehydration axis. The motor power drives the washing shaft through the switching of the electromagnetic clutch and simultaneously passes to the washing shaft and the dehydration shaft. The structure of the motor built-in electromagnetic clutch structure is complex, high cost and short service life.

The Chinese patent application No. 00120729.6 discloses a washing machine with a new direct drive clutch that is driven directly by the motor. The pulsator shaft is directly connected with the output shaft of the motor, and the rotating shaft sleeve is arranged on the output shaft of the motor. The rotating sleeve is fixedly connected with the washing tub and is rotated synchronously. A floating clutch mechanism is provided, which has two operating states: in the dehydration state, the floating clutch mechanism falling and engaging with the output shaft of the motor and the rotating sleeve to realize synchronous rotation of the output shaft and the rotating sleeve and driving washing tub to rotate. In the washing state, the floating clutch mechanism raises and is disconnected from the output shaft of the motor. The clutch device of the washing machine has a relatively simple structure and a low cost, the production process is simple, but a relatively larger washing water is required. If the water level is low, it is difficult to lift the floating clutch mechanism. Even if the water level is high, the laundry washing flip also can suppress the floating clutch mechanism.

An automatic washing machine of the patent application No. 201320560102.X filed by the applicant before comprises an outer tub, an inner tub, a pulsator and a driving means. The driving means comprises at least two rotors and at least one stator, wherein a rotor is connected with the inner drum shaft, and a rotor is connected with the pulsator shaft. The drive means is a variable frequency direct drive motor, and the rotor, the stator, the inner tub shaft and the pulsator shaft are arranged coaxially. The inner tub shaft is hollow and the pulsator shaft is arranged in the inner tub shaft. The pulsator and the inner tub rotate in the same direction or reversely rotate during the washing process of the washing machine. Or one of the pulsator and the inner tub rotates. The pulsator and the inner tub rotate in the same direction with the same speed during the dehydration process.

However, it also has the following defects after several experiments: as the best working range for the direct drive motor driving rotor is 600-800 rev/min, the energy consumption is relatively low in this range. If the rotor rotates at a low rotational speed, it has a higher energy consumption. It consumes additional energy to maintain the low rotational speed, and consumes more energy than using the high rotational speed. The structure in the scheme of the above mentioned uses double rotors to directly drive the pulsator and the inner tub to rotate. The inner tub and the pulsator have a relatively low rotation speed during the washing process, which generally is 100-150 rev/min. A higher additional energy consumption will be required if the two rotors wants to maintain a low speed at the same time during the washing process and the rinsing process. Among the factors that affect the cleaning ratio of the laundry, the control of the rotating speed of the pulsator for stirring clothes and water flow accounts for a large proportion. A higher additional energy consumption will be required if the two rotors wants to maintain a low speed at the same time.

In addition, because the changes of controlling the rotation of the pulsator during the washing process are relatively more, the rotor directly acting on the pulsator shaft and the pulsator during the speed change. The change in speed is not smooth and there is no buffer during the changing, which causes the laundries winding and affacts the washing effect. The wastage on rotor and the pulsator shaft is relatively great.

In view of the foregoing, the present disclosure is proposed.

SUMMARY OF THE INVENTION

The technical problem to be solved by the present disclosure is to overcome the shortcomings of the prior art and to provide a completely new automatic washing machine which uses the cooperation between a deceleration means and a rotor of a double rotors direct drive motor driving a pulsator relatively increases the rotational speed of the rotor during the washing process and saves energy.

An another object of the present disclosure is to disclose a control method of the automatic washing machine.

In order to solve the technical problem described above, the basic scheme adopted by the present disclosure is that, an automatic washing machine, comprising an outer tub, an inner tub, a pulsator and a driving means, wherein the driving means comprises two rotors, a stator and a deceleration mechanism, one rotor drives the pulsator to rotate after being decelerated by the deceleration mechanism, and other rotor drives the inner tub to rotate at a same speed as the other rotor.

Further, the deceleration mechanism comprises a rotatable housing, and a gear mechanism arranged in the housing, an inner tub shaft, a pulsator shaft and an input shaft. The inner tub shaft is a shaft sleeve structure, one end is connected with the inner tub and the other end is connected with the housing. The housing is connected with one rotor. The pulsator shaft is coaxially arranged in the inner tub shaft, one end is connected with the pulsator and the other end is connected with an output of the gear mechanism. One end of the input shaft is connected with the other rotor; the other end is connected with an input of the gear mechanism.

Further, the two rotors are an inner rotor and an outer rotor. The stator is a disc-shaped structure with a downward concave center, which in turn comprises from inside to outside a central bearing housing, an inner rotor mounting groove with a downward opening, a stator winding, an outer rotor mounting groove with an upward opening, and a mounting base which is at an outer edge and relatively fixed with the outer tub. The deceleration mechanism is located at the downward concave center of the stator, and the outer rotor is arranged above the stator to match the shape of the stator. A center of the outer rotor has a cavity for accommodating the deceleration mechanism, and an inner wall of the cavity is connected with the housing of the deceleration mechanism. The inner rotor is disposed below the stator and is connected to the input shaft.

Further, the gear mechanism comprises a sun gear, an internal ring gear and a planetary gear meshing with the sun gear and the internal ring gear respectively. The sun gear is mounted on the input shaft, the planetary gear is mounted on a planet wheel carrier, the planet wheel carrier is connected with the pulsator shaft. A lower end of the internal ring gear is provided with a lower end cover; the lower end cover is connected directly or indirectly to the stator.

Further, the gear mechanism comprises a central gear, an internal ring gear and a transmission gear meshing with the central gear and the internal ring gear respectively. The central gear is mounted on the input shaft, the internal ring gear is connected with the pulsator shaft, the transmission gear is mounted on a lower end cover through a gear shaft, the lower end cover is connected directly or indirectly to the stator.

Further, the gear mechanism comprises an input gear, an output gear, and a transmission gear meshing with the input gear and the output gear respectively. The input gear is mounted on the input shaft; the output gear is mounted on the pulsator shaft. The transmission gear is a double gear including an upper gear and a lower gear, the upper gear meshes with the output gear and the lower gear meshes with the input gear. The transmission gear is mounted on a lower end cover through a gear shaft, the lower end cover is connected directly or indirectly to the stator.

Further, the lower end cover is connected with an input sleeve, the input sleeve is arranged outside the input shaft, and the input sleeve is spline-connected with the stator.

Further, the deceleration mechanism has a reduction ratio in a range from 1/10 to 1/2.

An alternative embodiment is: the two rotors are an inner rotor and an outer rotor, the stator is a disc-shaped structure. The deceleration mechanism is located in a concave cavity of a middle of the stator. The inner rotor is connected with the inner tub shaft, the out rotor is connected with the input shaft of the deceleration mechanism, the output shaft of the deceleration mechanism is connected with the pulsator.

A housing of the deceleration mechanism in the alternative scheme is rotatable, the rotating housing is connected with the inner rotor as a whole. The gear mechanism is the same as each of the above described schemes under this scenario. Or the housing is fixedly connected with the stator as a whole. The inner rotor is covered above the housing. In the above embodiments, the lower end cover of the deceleration mechanism is integrally formed with the housing, and the other gear transmission relations are the same as those of the above-mentioned respective embodiments.

Or, a further alternative embodiment is, the stator is a disc-shaped structure. The deceleration mechanism is located in a concave cavity of the middle of the stator. The two rotors are both outer rotors, which are respectively located above and below the deceleration mechanism. The deceleration mechanism and the stator are arranged between an upper rotor and a lower rotor. The upper rotor is connected with the inner tub shaft, the lower rotor is connected with the input shaft of the deceleration mechanism, the output shaft of the deceleration mechanism is connected with the pulsator.

The deceleration mechanism of the present scheme is an independent structure, which comprises a housing, an input shaft, an output shaft and a gear mechanism. The housing and the stator are integrally fixed. The lower end cover of the deceleration mechanism is integral with the housing, and the other gear transmission relations are the same as those of the above embodiments.

A control method of the automatic washing machine of the present disclosure comprises, the two rotors driving the pulsator and the inner tub to rotate in a same direction or rotate in an opposite direction to each other during the washing process, the pulsator and the inner tub rotating in the same direction at the same rotational speed during the dehydration process.

Further, during the dehydration process, the two rotors first rotate for a set time, the inner tub and the pulsator rotate in the same direction, then the rotor that drives the pulsator to rotate is controlled to be in a free state, and only the rotor that drives the inner tub to rotate is controlled at a high speed.

Or, during the dehydration process, the rotor that drives the pulsator to rotate and the rotor that drives the inner tub to rotate are controlled to rotate at the same time, and the inner tub and the pulsator are maintained rotating in the same direction at the same speed in the whole dehydration process.

By adopting the technical proposal, the present disclosure has the following beneficial effects compared with the prior art.

The washing machine of the present disclosure uses two rotors to respectively drive the inner tub and the pulsator to rotate. Although the deceleration mechanism is used on the rotor that drives the pulsator to rotate, the transmission efficiency and the stability are improved compared with the existing speed reduction distribution system using one input power and two outputs. In addition, since the use of washing and dehydration conditions conversion clutch, space and cost are still saved, and the installation structure is simple, the weight and the volume of the drive system are reduced to some extent. Since the deceleration clutch device is eliminated, the control of the present disclosure is more convenient, the washing and dehydration process conversion is stable.

The scheme of the present disclosure has an effect of reducing energy consumption compared with the scheme of the dual-rotor direct driving the inner tub and the pulsator. After a long period of testing it is found that the two rotors of the direct drive motor have a lowest energy consumption when they work in the best working range of speed within the parameters of their own, such as 600 rev/min. If the two rotors are controlled to drive the inner tub and the pulsator at a low speed, the power consumption is the highest. Even when running at the speed over the optimum operating range for the same amount of time, the energy consumption is lower than that of the low-speed operation. The present disclosure controls only the low rotation speed of the rotor that drives the inner tub, and maintains the rotor that drives the pulsator rotating in the optimum working speed range through the deceleration of the deceleration mechanism, which can save about 20% to 40% energy consumption.

In addition, relative to the rotor mounted directly on the pulsator shaft, between the rotor and the pulsator is provided with a deceleration mechanism of the present disclosure. The rotor speed changes in the pulsator embodies a certain buffer, clothes softly turn, and the winding is reduced between the laundries.

DETAILED DESCRIPTION OF THE INVENTION

The following is further described in details with embodiments of the present disclosure.

As shown from FIG. 1 to FIG. 4, the automatic washing machine of the present disclosure includes an outer tub 1, an inner tub 2, a pulsator 3 and a driving means. The driving means comprises two rotors 41, 42, a stator 43 and a deceleration mechanism 5, one rotor 41 drives the pulsator 3 to rotate after decelerated through the deceleration mechanism 5, the other rotor 42 drives the inner tub 2 to rotate as a same speed as the rotor 42 itself.

The washing machine of the present disclosure controls the two rotors 41, 42 to respectively drive the pulsator 3 and the inner tub 2 to rotate in the same direction with different rotation speed, or the pulsator 3 and the inner tub 2 to rotate reversely during the washing process. The two rotors 41, 42 drive the pulsator 3 and the inner tub 2 to rotate in the same direction with the same speed during the dehydration process.

Embodiment 1

Figure 1:
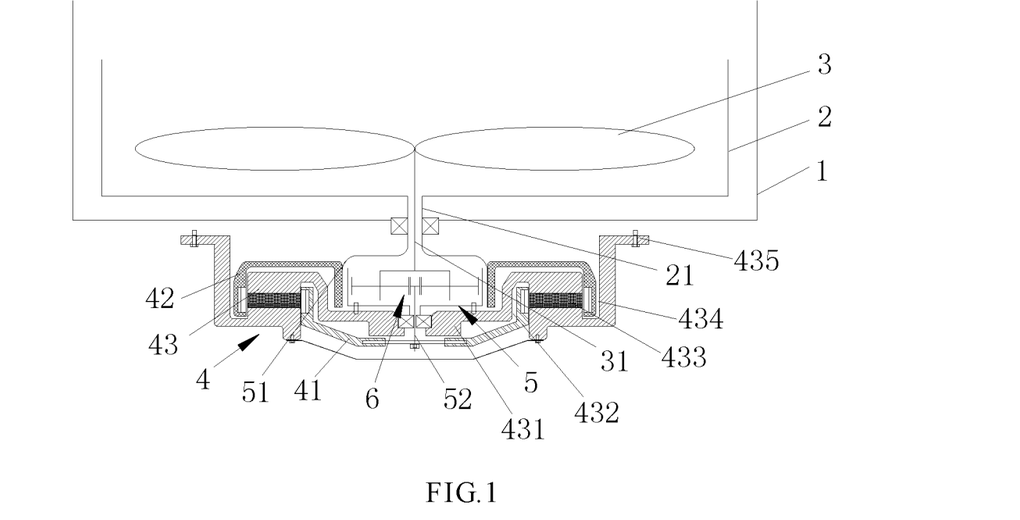
FIG. 1 to FIG. 4 are respectively a schematic view of a different mounting structure of a driving means of a washing machine according to the present disclosure.
Figure 2:
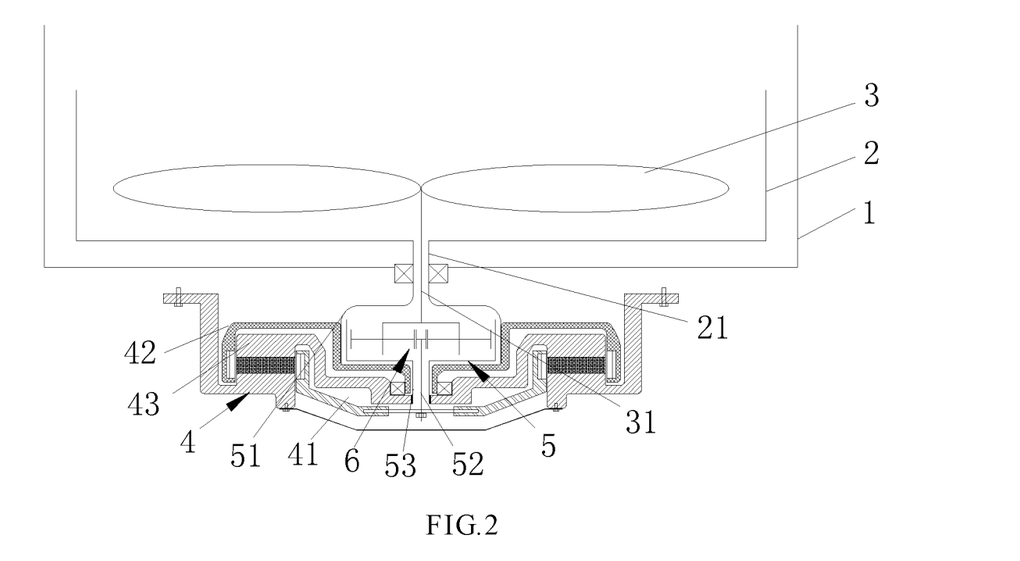

As shown in FIG. 1 and FIG. 2, the deceleration mechanism 5 of the present embodiment comprises a rotatable housing 51, a gear mechanism 6 arranged in the housing 51, an inner tub shaft 21, a pulsator shaft 31 and an input shaft 52. The housing 51 and the gear mechanism 6 rotate relatively independently. The inner tub shaft 21 is a sleeve structure, one end of which is connected to the inner tub 2, and the other end thereof is connected to the housing 51. The housing 51 is connected with the rotor 42. The pulsator shaft 31 is coaxially disposed in the inner tub shaft 21, one end is connected to the pulsator 3, and the other end is connected with a power output end of the gear mechanism 6. One end of the input shaft 52 is connected to the rotor 41 and the other end thereof is connected to the power input end of the gear mechanism 6.

The two rotors of the direct drive motor 4 are respectively an inner rotor 41 and an outer rotor 42. The stator 43 is a disc-shaped structure with a downward concave center, which in turn comprises from inside to outside a central bearing housing 431, an inner rotor mounting groove 432 with a downward opening, a stator winding 433, an outer rotor mounting groove 434 with an upward opening, and a mounting base 435 which is at an outer edge and relatively fixed to the outer tub. The deceleration mechanism 5 is located at the downward concave center of the stator 43, and the outer rotor 42 is arranged above the stator 43 to match the shape of the stator 43. A center of the outer rotor 42 has a cavity for accommodating the deceleration mechanism, and an inner wall of the cavity is connected with the housing 51 of the deceleration mechanism. The inner rotor 41 is disposed below the stator 43 and is connected to the input shaft 52.

Embodiment 2

Figure 5:
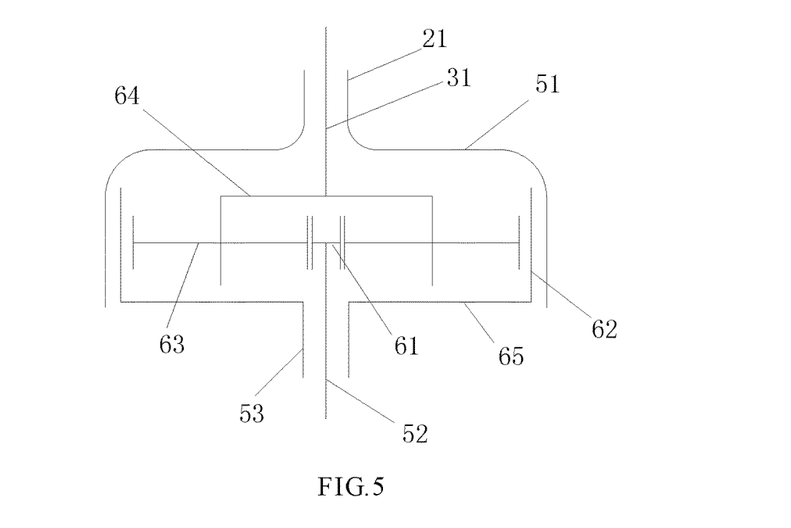
FIG. 5 to FIG. 8 are respectively a schematic view of a different structure of a deceleration mechanism according to the present disclosure.

As shown in FIG. 5, the gear mechanism 6 of the deceleration mechanism of the present embodiment comprises a sun gear 61, an internal ring gear 62 and a planetary gear 62 meshing with the sun gear 61 and the internal ring gear 62 respectively. The sun gear 61 is mounted on the input shaft 52. A plurality of planetary gears 63 are provided and which are mounted on a planet wheel carrier 64, and the planet wheel carrier 64 is connected with the pulsator shaft 31. A lower end of the internal ring gear 62 is provided with a lower end cover 65, the lower end cover 65 is directly connected with an upper surface of the stator 43. (see FIG. 1). Or the lower end cover is connected with an input sleeve 53, the input sleeve 53 is arranged outside of the input shaft 52, and the input sleeve 53 is spline-connected with the stator 43.

A reduction ratio of the deceleration mechanism is in a range from 1/10 to 1/2, the reduction ratio of 1/5 is taken as an example, and the deceleration mechanism engages with the direct drive motor 4 of the embodiment 1. During the washing process, the inner rotor 41 rotates forward at a speed of 600 rev/min and the input shaft 52 rotates forward to drive the sun gear 61 to rotate forward. Through the deceleration of the planetary gear 63 and planet wheel carrier 64, the pulsator shaft 31 rotates forward at a speed of 120 rev/min. At this time, if the outer rotor 42 drives the inner tub shaft 21 to rotate reversely at a speed of 100 rev/min, a double power washing system in which the inner tub 2 and the pulsator 3 rotate reversely is formed. Or, the outer rotor 42 drives the inner tub shaft 21 to rotate forward at a speed of 80 rev/min so that the inner tub 2 and the pulsator 3 rotate in the same direction with different rotation speed to wash. During the dehydration process, the inner rotor 41 is driven to rotate in the same direction as the outer rotor 42 at a speed five times faster than the one of the outer rotor 42.

Embodiment 3

Figure 6:
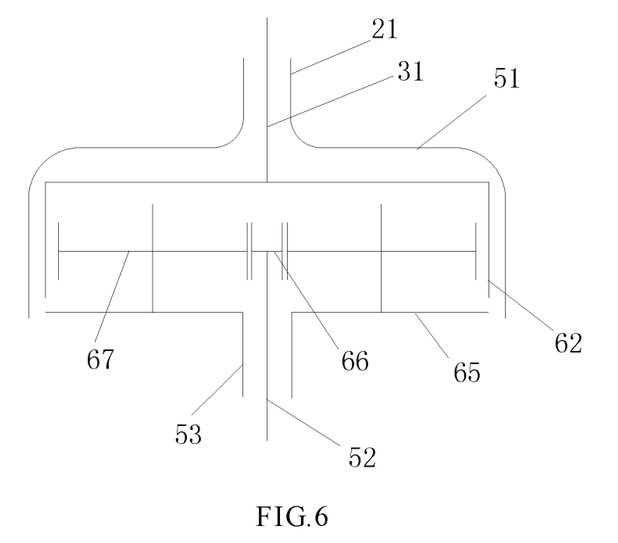

As shown in FIG. 6, the gear mechanism 6 of the deceleration mechanism comprises a central gear 66, an internal ring gear 62 and a transmission gear 67 meshing with the central gear 66 and the internal ring gear 62 respectively. The central gear 66 is mounted on the input shaft 52, the internal ring gear 62 is connected with the pulsator shaft 31, the transmission gear 67 is mounted on a lower end cover 65 through a gear shaft, and the lower end cover 65 is connected directly to an upper surface of the stator 43 (see FIG. 1). Or, the lower end cover is connected to an input sleeve 53, the input sleeve 53 is arranged outside the input shaft 52, and the input sleeve 53 is spline-connected with the stator 43 (see FIG. 2).

The deceleration mechanism with the reduction ratio of 1/6 is taken as an example, in combination with the direct drive motor 4 of the embodiment 1. During the washing process, the inner rotor 1 rotates forward at a speed of 600 rev/min, and the input shaft 52 rotates forward, which drives the central gear 66 to rotate forward. Through the deceleration of the transmission gear 67 and the internal ring gear 62, the pulsator shaft 31 rotates reversely at a speed of 100 rev/min. At this time, if the outer rotor 42 drives the inner tub shaft 21 to rotate forward at a speed of 100 rev/min, a double power washing system in which the inner tub 2 and the pulsator 3 rotate reversely is formed. Or, the outer rotor rotates at a speed of 80 rev/min to drive the inner tub shaft 21 to rotate reversely, so that the inner tub 2 and the pulsator 3 rotate in the same direction with different speed. During the dehydration process, the inner rotor 41 is driven to rotate in different direction from the outer rotor 42 at a speed five times faster than the one of the rotor 42.

Embodiment 4

Figure 7:
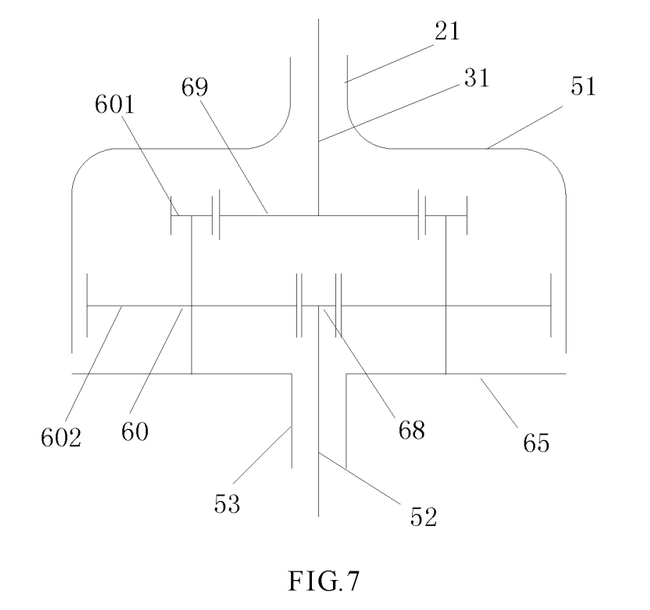

As shown in FIG. 7, the gear mechanism 6 of the deceleration mechanism of the present embodiment comprises an input gear 68, an output gear 69, and a transmission gear 60 meshing with the input gear 68 and the output gear 69 respectively. The input gear 68 is mounted on the input shaft 52, the output gear 69 is mounted on the pulsator shaft 31. The transmission gear 60 is a double gear including an upper gear 601 and a lower gear 602. The upper gear 601 meshes with the output gear 69 and the lower gear 602 meshes with the input gear 68. The transmission gear 60 is mounted on a lower end cover 65 through a gear shaft, the lower end cover is connected directly to an upper surface of the stator (see FIG. 1). Or, the lower end cover is connected with an input sleeve 53. The input sleeve 53 is arranged outside the input shaft 52, the input sleeve 53 is spline-connected with the stator 43 (see FIG. 2).

The deceleration mechanism of the embodiment with the reduction ratio of 1/4 is taken as an example, and to engage with the direct drive motor 4 of the embodiment 1. During the washing process, the inner rotor rotates forward at a speed of 600 rev/min, the input shaft 52 rotates forward, which drives the input gear 68 to rotate forward. Through the deceleration of the transmission gear 60 and the output gear 69, the pulsator 31 rotates forward at a speed of 120 rev/min. At this time, if the outer rotor 42 drives the inner tub shaft 21 to rotate reversely at a speed of 90 rev/min, a double power washing system in which the inner tub 2 and the pulsator 3 rotate reversely is formed. Or the outer rotor 42 drives the inner tub shaft 21 to rotate forward at a speed of 80 rev/min, so that the inner tub 2 and the pulsator 3 rotate in the same direction with different speed to wash. During the dehydration process, the inner rotor 41 is driven to rotate in the same direction as the outer rotor 42 at a speed five times faster than the outer rotor 42.

Embodiment 5

Figure 3:
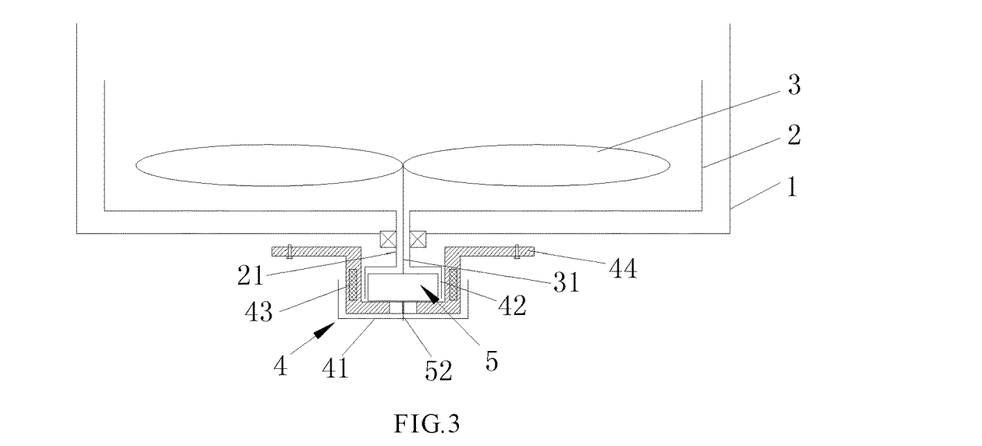

As shown in FIG. 3, the difference of the present embodiment from the embodiment 1 is that, though the two rotors 41, 42 of the direct drive motor 4 are one inner rotor and one outer rotor, the rotor 42 that drives the inner tub 2 to rotate is the inner rotor, and the rotor 41 that drives the pulsator 3 to rotate through the deceleration of the deceleration mechanism 5 is the outer rotor. The stator 43 is a disc-shaped structure, the deceleration mechanism 5 is located in a concave cavity of the middle of the stator 43. An outer periphery of the stator 43 is flanged to form with a mounting base 44 which is relatively fixed with the outer tub 1. The inner rotor 42 is located above the reduction mechanism 5 and connected to the inner tub shaft 21. The outer rotor 41 is located below the deceleration mechanism 5 and is connected with the input shaft 52 of the deceleration mechanism 5. The output shaft of the deceleration mechanism is the pulsator shaft 31, which is connected with the pulsator 3.

The housing of the deceleration mechanism 5 of the present embodiment is rotatable, the rotating housing is connected with the inner rotor as a whole. Under this scenario, the gear mechanism is the same as the ones of the above-described embodiments from 2 to 5. Or the housing 51 of the deceleration mechanism 5 of the present embodiment is fixedly connected with the stator 43, and the inner rotor covers above the housing (see FIG. 3). The lower end cover 65 of the deceleration mechanism in the above-described schemes is integrally connected to the housing 51, and the other gear transmission relationships are the same as those in the above-described schemes.

Embodiment 6

Figure 4:
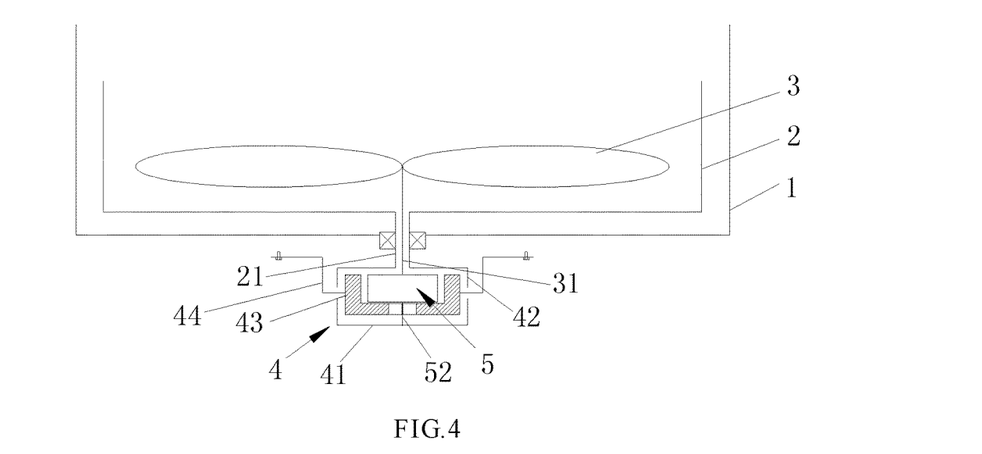

As shown in FIG. 4, the stator of the direct drive motor 4 of the present embodiment is a disc-shaped structure, the deceleration mechanism 5 is located in a concave cavity of the middle of the stator 43. The two rotors 41, 42 are both outer rotors, which are respectively located above and below the deceleration mechanism 5. The deceleration mechanism 5 and the stator 43 are arranged between an upper rotor 41 and a lower rotor 42, the stator 43 is relatively fixed to the outer tub 1 through a mounting base 44 which sticks between the two rotors. The upper rotor 42 is connected with the inner tub shaft, the lower rotor 41 is connected with the input shaft 52 of the deceleration mechanism 5. The output shaft of the deceleration mechanism which is the pulsator 31 is connected with the pulsator 3.

Figure 8:
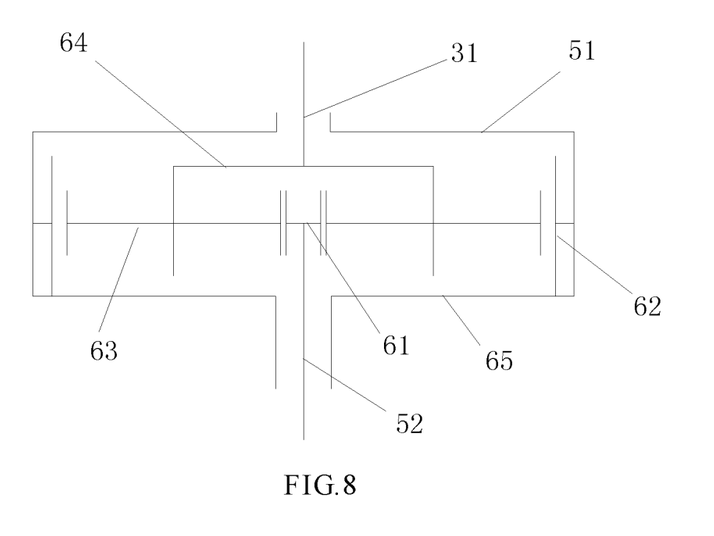

As shown in FIG. 8, the deceleration mechanism of the present scheme is an independent structure, which comprises a housing 51, an input shaft 52, an output shaft 31 and a gear mechanism. The housing 51 and the stator 43 are integrally fixed. The lower end cover 65 of the deceleration mechanism is integrally mounted on the housing 51, and the other gear transmission relations are the same as those of the above schemes.

The gear mechanism in the deceleration mechanism according to the present disclosure is not limited to the structures in the embodiments from 2 to 4, and other gear transmission structures capable of achieving output deceleration are suitable for use in the present disclosure. The structure of the two rotors of the present disclosure is likewise not limited to the structure of the embodiments. Such as the deceleration mechanism in embodiment 1 can also be an independent structure (see FIG. 8). The housing and the stator are fixed, and the outer rotor covers above the housing and the stator (see FIG. 4).

Embodiment 7

In the control method of the automatic washing machine of the present disclosure, during the washing process, the two rotors drive the pulsator and the inner tub to rotate in a same direction or in oppositional direction to each other. During the dehydration process, the pulsator and the inner tub rotates in the same direction with the same rotation speed.

During the dehydration process, the two rotors first rotate for a set time, the inner tub and the pulsator rotate in the same direction, then the rotor that drives the pulsator to rotate is controlled to be in a free state, and only the rotor that drives the inner tub to rotate is controlled to rotate at a high speed.

Or, during the dehydration process, the rotor that drives the pulsator to rotate and the rotor that drives the inner tub to rotate are controlled to rotate at the same time, and maintain the inner tub and the pulsator rotating in the same direction at the same speed in the whole dehydration process.

The embodiments in the above described may be further combined or replaced and the description is only preferred embodiments of the disclosure but not intended to be limited to the spirit and scope of the present disclosure. It should be noted that without departing from the design concept of the present disclosure, various variations and improvements made to the technical solutions of the present disclosure by persons skilled in the art all belong to the protection scope of the present disclosure.

The invention claimed is:

1. An automatic washing machine comprising:
   an outer tub;
   an inner tub;
   a pulsator; and
   a driving means, wherein the driving means includes an inner rotor and an outer rotor, a stator and a deceleration mechanism, the outer rotor configured to drive the pulsator to rotate after being decelerated by the deceleration mechanism, and the inner rotor configured to drive the inner tub to rotate at a same speed as the other rotor, and
   wherein the deceleration mechanism comprises a housing, and a gear mechanism arranged in the housing, an inner tub shaft, a pulsator shaft and an input shaft,
   the stator is a disc-shaped structure with a downward concave center,
   the stator comprises, in order from inside to outside, a central bearing housing, an inner rotor mounting groove with a downward opening, a stator winding, an outer rotor mounting groove with an upward opening, and a mounting base which is at an outer edge and relatively fixed with the outer tub,
   the deceleration mechanism is located at the downward concave center of the stator, and the outer rotor is arranged above the stator to match the shape of the stator,
   a center of the outer rotor has a cavity for accommodating the deceleration mechanism, and an inner wall of the cavity is connected with the housing of the deceleration mechanism, the inner rotor is disposed below the stator and is connected to the input shaft,
   the inner tub shaft is a shaft sleeve structure, one end of the inner tub shaft is connected with the inner tub and another end of the inner tub shaft is connected with the housing, the housing is rotatable, the housing is connected with the inner rotor,
   the pulsator shaft is coaxially arranged in the inner tub shaft, one end of the pulsator shaft is connected with the pulsator and another end of the pulsator shaft is connected with an output of the gear mechanism, and
   one end of the input shaft is connected with the inner rotor, another end of the input shaft is connected with an input of the gear mechanism.

2. The automatic washing machine according to claim 1, wherein the gear mechanism comprises a sun gear, an internal ring gear and a planetary gear meshing with the sun gear and the internal ring gear respectively,
   the sun gear is mounted on the input shaft, the planetary gear is mounted on a planet wheel carrier,
   the planet wheel carrier is connected with the pulsator shaft,
   a lower end of the internal ring gear is provided with a lower end cover, the lower end cover is connected directly or indirectly to the stator.

3. The automatic washing machine according to claim 1, wherein the gear mechanism comprises a central gear, an internal ring gear and a transmission gear meshing with the central gear and the internal ring gear respectively,
   the central gear is mounted on the input shaft,
   the internal ring gear is connected with the pulsator shaft,
   the transmission gear is mounted on a lower end cover through a gear shaft, the lower end cover is connected directly or indirectly to the stator.

4. The automatic washing machine according to claim 3, wherein the lower end cover is connected with an input sleeve, the input sleeve is arranged outside the input shaft, and the input sleeve is spline-connected with the stator.

5. The automatic washing machine according to claim 3, wherein the deceleration mechanism has a reduction ratio in a range from 1/10 to 1/2.

6. The automatic washing machine according to claim 1, wherein the gear mechanism comprises an input gear, an output gear, and a transmission gear meshing with the input gear and the output gear respectively,
   the input gear is mounted on the input shaft,
   the output gear is mounted on the pulsator shaft,
   the transmission gear is a double gear including an upper gear and a lower gear, the upper gear meshes with the output gear and the lower gear meshes with the input gear,
   the transmission gear is mounted on a lower end cover through a gear shaft, the lower end cover is connected directly or indirectly to the stator.

7. The automatic washing machine according to claim 6, wherein the lower end cover is connected with an input sleeve, the input sleeve is arranged outside the input shaft, and the input sleeve is spline-connected with the stator.

8. The automatic washing machine according to claim 6, wherein the deceleration mechanism has a reduction ratio in a range from 1/10 to 1/2.

9. The automatic washing machine according to claim 2, wherein the lower end cover is connected with an input sleeve, the input sleeve is arranged outside the input shaft, and the input sleeve is spline-connected with the stator.

10. The automatic washing machine according to claim 2, wherein the deceleration mechanism has a reduction ratio in a range from 1/10 to 1/2.

11. The automatic washing machine according to claim 1, wherein the deceleration mechanism has a reduction ratio in a range from 1/10 to 1/2.

12. A control method of the automatic washing machine according to claim 1, comprising, the two rotors driving the pulsator and the inner tub to rotate in a same direction or rotate in an opposite direction to each other during a washing process, the pulsator and the inner tub rotating in a same direction at a same rotational speed during a dehydration process.

13. The control method of the automatic washing machine according to claim 12, wherein during the dehydration process, the two rotors first rotate for a set time, the inner tub and the pulsator rotate in the same direction, then the rotor that drives the pulsator to rotate is controlled to be in a free state, and only the rotor that drives the inner tub to rotate is controlled at a high speed.

14. An automatic washing machine comprising:

an outer tub;

an inner tub;

a pulsator; and a driving means, wherein the driving means comprises an inner rotor and an outer rotor, a stator and a deceleration mechanism, the outer rotor configured to drive the pulsator to rotate after being decelerated by the deceleration mechanism, and the inner rotor configured to drive the inner tub to rotate at a same speed as the other rotor, wherein the stator is a disc-shaped structure, the deceleration mechanism is located in a concave cavity of a middle of the stator, the inner rotor is connected with an inner tub shaft, the outer rotor is connected with an input shaft of the deceleration mechanism, an output shaft of the deceleration mechanism is connected with the pulsator.

\* \* \* \* \*